United States Patent Office 3,050,840
Patented Aug. 28, 1962

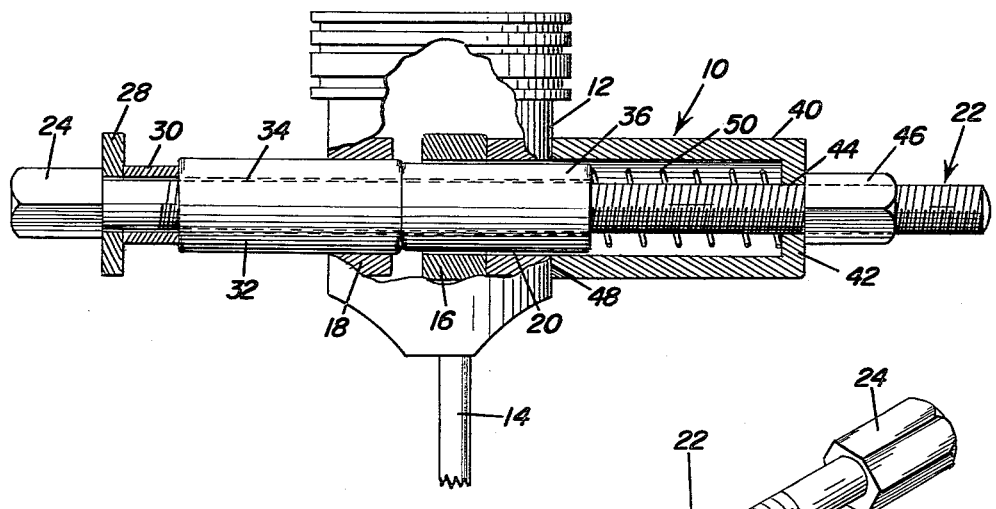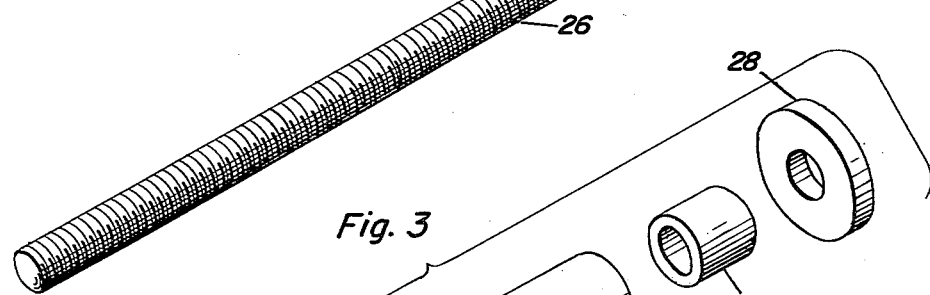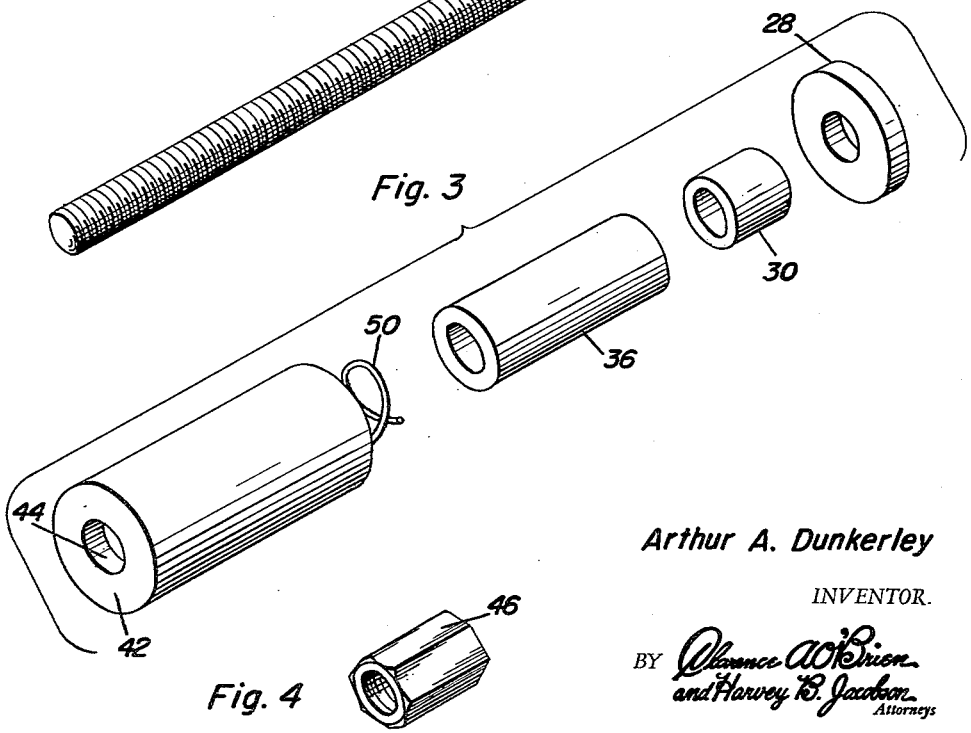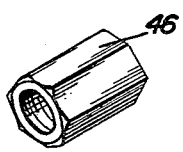
Arthur A. Dunkerley
INVENTOR.

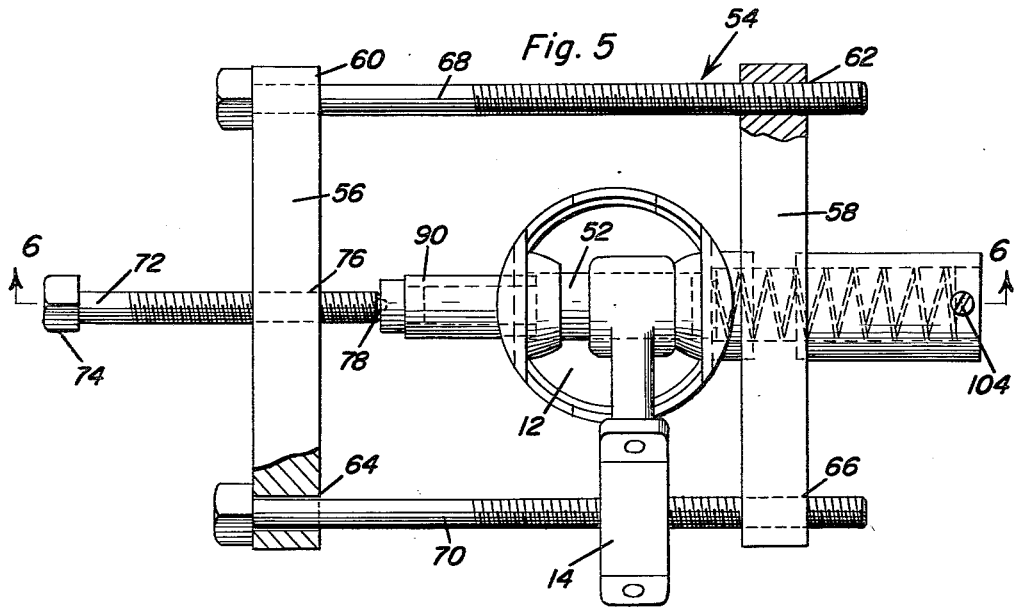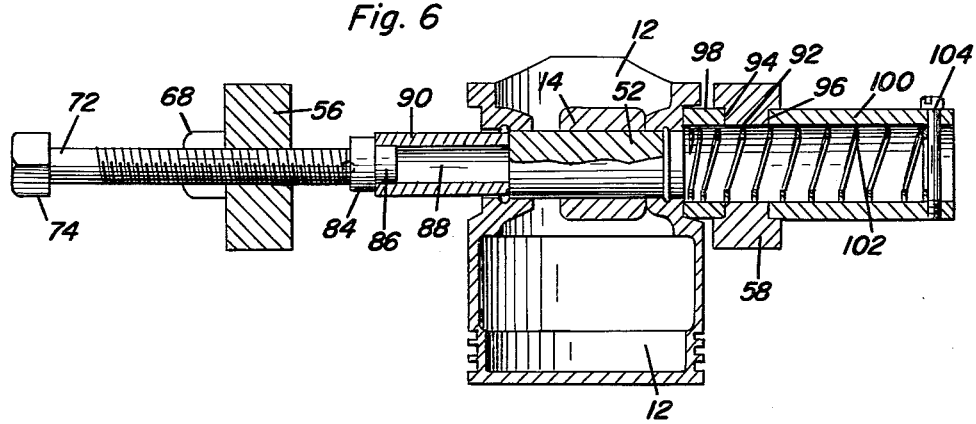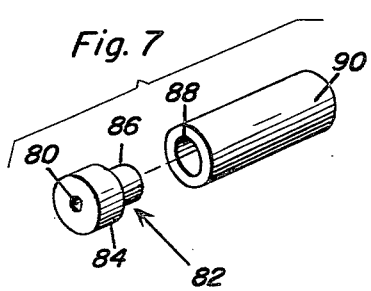
Arthur A. Dunkerley
INVENTOR.

3,050,840
PISTON PIN INSTALLING TOOL
Arthur A. Dunkerley, 1413 Campus Road,
Los Angeles, Calif.
Filed Apr. 1, 1959, Ser. No. 803,456
2 Claims. (Cl. 29—263)

This invention relates generally to a tool and more particularly to a tool particularly designed to enable piston wrist pins to be removed and installed.

It is well known that internal combustion engines all include pistons carried by connecting rods which may be connected to the driveshaft for providing power to such as an automobile. In the operation of the internal combustion engine, the piston reciprocates within the cylinder and its motion is imparted to the associated connecting rod which transmits rotational power to the driveshaft. Accordingly, it is apparent that the connecting rod must be able to slightly pivot relative to the piston. Therefore, a piston wrist pin is generally provided for properly connecting the piston and the connecting rod. In most instances, the piston wrist pin establishes a force fit with the connecting rod. The wrist pin extends on either side of the rod and the extended portions are provided with some clearance relative to the piston aperture for allowing the pin to limitedly pivot therein. It will be appreciated that the connecting rod may therefore pivot slightly with respect to the piston. Because of the force fit between the connecting rod and the piston wrist pin, it is difficult to normally install or remove the wrist pin. Accordingly, the applicant has herein disclosed the novel construction of his invention whose principal object is to provide a tool construction particularly designed to facilitate the installation and removal of piston wrist pins.

Generally, hollow wrist pins are utilized in order to reduce weight and allow an improved and more efficient operation. However, in some engine types, solid wrist pins are utilized. Accordingly, it is a further object of this invention to provide two tool embodiments falling under the teachings of the invention wherein a first embodiment is adapted to be utilized with hollow wrist pins while a second embodiment is adapted to be utilized with solid wrist pins.

It is a still further object of this invention to provide a novel tool construction for removing and installing piston wrist pins which is simple in construction, reliable, and inexpensive to manufacture.

In accordance with the above stated objects, a first construction is described for utilization with hollow piston wrist pins and includes a central bolt adapted to pass through the wrist pin. A hollow pin guide is also received on the bolt adjacent the pin. A cylindrical body, containing a spring therein, is received on the bolt and abuts the piston. A nut is threadedly engaged with the bolt and is positioned outwardly of the cylindrical body so that upon threading the nut on the bolt, the nut will bear against the cylindrical body to urge the cylindrical body against the piston so that the bolt is drawn therethrough. It will be seen then that the piston guide pin may either force a hollow piston pin out of the rod or if a piston wrist pin is carried by the bolt, the wrist pin may follow the guide pin through the rod. For use with a solid wrist pin, a pair of cross members are provided, being held together by a pair of terminal bolts. A central bolt is threadedly passed through the first cross member. The central bolt has a ball fixed to the end thereof and the ball cooperates with a depression in a flanged sleeve. An undersized hollow pin is provided and the flanged sleeve projects therein with the flange abutting the wall of the undersize hollow pin. In turn, the undersized hollow pin abuts the solid pin. Again, a cylindrical body is carried by the second cross member and has a cavity therein containing a spring. Upon threading the central bolt through the first cross member, the undersized hollow pin bears against the solid pin to force the solid pin into the cylindrical body.

Other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a sectional view illustrating the components of the tool when utilized with the piston and rod, shown partially broken away;

FIGURE 2 is a perspective view of the central bolt utilized in one embodiment;

FIGURE 3 is a perspective view of the individual components of the tool received on the bolt;

FIGURE 4 is a perspective view of the turn nut;

FIGURE 5 is an elevational plan view partially broken away of the second embodiment;

FIGURE 6 is a sectional view taken substantially along the plane 6—6 of FIGURE 5; and FIGURE 7 is a perspective view of the undersized hollow pin and flange sleeve.

With continuing reference to the drawings and initial reference to the embodiment of FIGURES 1 through 4, numeral 10 generally represents the tool comprising this invention adapted to be utilized with a conventional piston 12 connected to a conventional rod 14. The rod 14 terminates in a ring portion 16 fitted between apertured bosses 18 and 20 within the piston 12. Since it is desired that an extremely tight fit be established between a wrist pin and the ring portion 16 of rod 14, the opening in the rod 14 must be slightly smaller than the apertured bosses 18 and 20 in piston 12.

The tool 10 initially includes an elongated bolt 22 preferably having a hexagonal head portion 24 and a threaded portion 26. A washer 28 is received on the bolt 22 adjacent the hexagonal head 24. A sleeve 30 is fitted on the bolt 22 adjacent the washer 28. In FIGURE 1, the device is illustrated installing a piston wrist pin 32 within the piston 12 and rod 14. To do this, the piston wrist pin 32 is received on the bolt 22 with the bolt 22 passing through the hollow portion 34 of the wrist pin 32. A guide pin 36 is similar to the wrist pin 32 but however, is slightly undersized to enable it to pass through the piston 12 and rod 14 easily. The guide pin 36 is received on the bolt 22 adjacent the wrist pin 32. A cylindrical body 40 has a bottom wall 42 with a central aperture 44 passing therethrough. The threaded portion 26 of the bolt 22 extends through the aperture 44 and receives a turn nut 46 thereon. The cylindrical body 40 bears against the piston at 48. A helical spring 50 is concentrically positioned on the bolt 22 and retained within the cylindrical body 40.

In order to install the wrist pin 32 within the rod 14 and piston 12, the tool is established within the piston 12 and rod 14 as is indicated in FIGURE 1. As will be obvious, the nut 46 is then turned so as to draw the bolt 22 through the rod 14 and piston 12 and likewise to position the piston wrist pin 32 within the rod 14 and piston 12. The spring 50 provides some resistance to the movement of the bolt 22 therethrough as the guide pin 36 compresses the spring 50, but however the spring 50 has a small spring constant and does not effectively hinder the draw of the bolt. However, the spring 50 does aid in aligning the guide pin and also enables the guide pin to be easily removed from the cylindrical body 40 when removing the tool 10 from the piston 12 and rod 14.

The embodiment illustrated in FIGURES 5 through 7 is utilized when a solid wrist pin 52 is desired to be removed from or installed in a piston 12 and rod 14.

The tool designated as 54 includes a first cross member 56 and a second cross member 58 having aligned apertures 60, 62, 64 and 66 for receiving terminal bolts 68 and 70 therethrough. The apertures 60 and 64 are not threaded and the bolt floats freely therein. However, the apertures 62 and 66 are threaded and are engaged with threaded portions of bolts 68 and 70.

A central bolt 72 having a hexagonal head 74 threadedly passes through an aperture 76 in the first cross member 56. Terminally secured to the bolt 72 is a ball 78 which is received in a depression 80 of a flanged plug 82. The flanged plug 82 includes the flange portion 84 and the reduced portion 86. The reduced portion 86 of flanged plug 82 extends within the hollow 88 of an undersized hollow pin 90. The flanged portion 84 abuts the walls of the undersized hollow pin 90 as particularly indicated in FIGURES 5 and 6.

The second cross member 58 includes a central aperture 92 and shoulder portion 94 and 96 adjacent thereto. A pair of hollow cylindrical sections 98 and 100 are aligned with the central aperture 92 and are supported in the shoulder portion 94 and 96 respectively. It will be noted that the sections 98 and 100 extend perpendicularly from the cross member 58. The hollow cylindrical cross sections 98 and 100 along with the central aperture 92 form a passage which accommodates a helical coil spring 102 which is retained within the passage by a screw 104. It is thought that the utilization of this embodiment should now be apparent. As indicated in FIGURES 5 and 6, it is desired to remove the solid wrist pin 52 from the rod 14 and piston 12. Accordingly, the cross members and terminal bolts are established as indicated and the hexagonal head 74 of bolt 72 is turned to thread the bolt through the aperture 76 so as to apply pressure to bolt 78 and flanged sleeve 82 upon undersized hollow pin 90. The hollow pin 90 abuts the solid pin 52 and it will be apparent that by applying sufficient pressure on the hollow pin 90, the solid pin 52 will be driven into the passage occupied by the spring 102. The spring 102 aids in removing the solid pin 52 from the cylindrical section 98 and 100 and cross member 58.

It is thought that the particular construction and utilization of the two embodiments should now be apparent to one skilled in the art. The materials utilized in the construction of the invention may of course be any materials that are sufficient to withstand the structural stress induced therein.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a piston and a pivotally associated rod, a tool for installing and removing a solid connecting wrist pin comprising a central threaded bolt, said central bolt aligned with said wrist pin, means for rotating said bolt, a pair of spaced cross members, two pairs of aligned apertures terminally positioned in said cross members, a terminal bolt received through each pair of said aligned apertures, each of said bolts having an abutment on one end floatingly engaging one of said cross members and threads on the other end mating with threads in one of the apertures in the other cross member, said central bolt threadedly received through a first of said cross members, said central bolt terminally carrying a ball type universal joint, a thrust transmitting member, depressions in said member and threaded bolt for receiving said ball, an undersized hollow pin, said thrust transmitting member abutting said hollow pin for driving said hollow pin against said wrist pin, a concave seat is formed on a second of said cross members, a sleeve secured on the second cross member, said sleeve, second cross member and seat having aligned bores of a diameter larger than said wrist pin, a coil spring in said bores for ejecting said wrist pin when the tool is removed from said piston, a removable spring abutment in the sleeve.

2. The combination of claim 1 wherein said abutment comprises a stud extending diametrically through and removably threaded in said sleeve.

References Cited in the file of this patent

UNITED STATES PATENTS

| | | |
|---|---|---|
| 1,280,233 | Jones | Oct. 1, 1918 |
| 1,346,665 | Maire | July 13, 1920 |
| 1,446,102 | Oldershaw | Feb. 20, 1923 |
| 1,454,086 | Staugaard | May 8, 1923 |
| 1,496,451 | Canfield et al. | June 3, 1924 |
| 1,597,909 | Livesay | Aug. 31, 1926 |
| 1,599,176 | Hersee | Sept. 7, 1926 |
| 1,625,344 | Vingheroets | Apr. 19, 1927 |
| 1,634,600 | Thompson | July 5, 1927 |
| 1,661,938 | Follingstad | Mar. 6, 1928 |
| 1,736,529 | Goeller | Nov. 19, 1929 |
| 1,824,743 | Neu | Sept. 22, 1931 |
| 2,362,656 | Medley | Nov. 14, 1944 |
| 2,520,974 | Spinnato | Sept. 5, 1950 |
| 2,860,407 | Grunder et al. | Nov. 18, 1958 |

FOREIGN PATENTS

| | | |
|---|---|---|
| 286,953 | Switzerland | Mar. 2, 1953 |